Sept. 29, 1970    J. A. FORD    3,531,666
LINEAR INDUCTION MOTOR ACTUATOR
Filed March 18, 1968    3 Sheets-Sheet 1

INVENTOR.
JAMES A FORD
BY
Woodhams, Blanchard & Flynn
ATTORNEYS

Sept. 29, 1970    J. A. FORD    3,531,666
LINEAR INDUCTION MOTOR ACTUATOR
Filed March 18, 1968    3 Sheets-Sheet 2

INVENTOR.
JAMES A. FORD
BY Woodhams, Blanchard & Flynn
ATTORNEYS

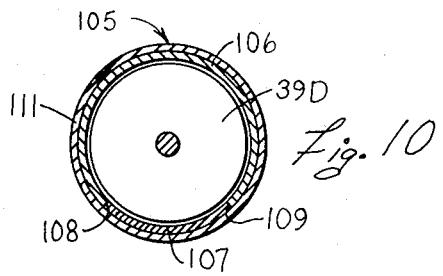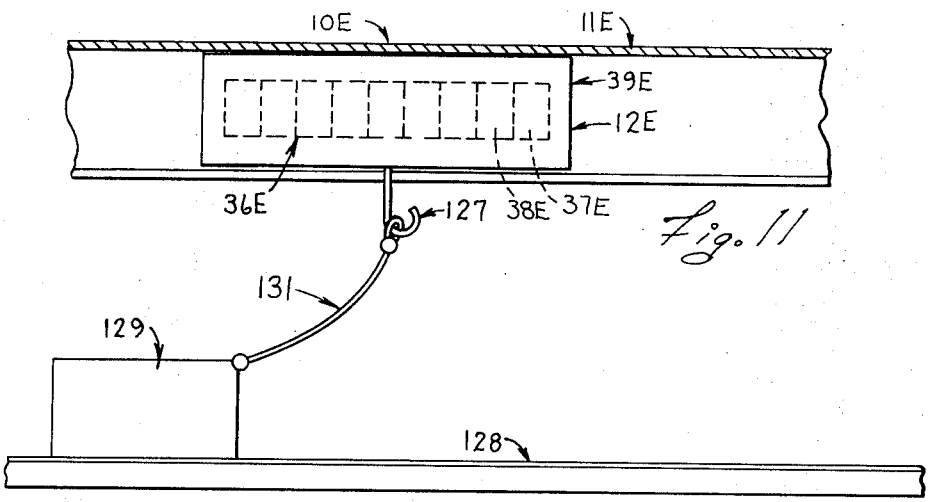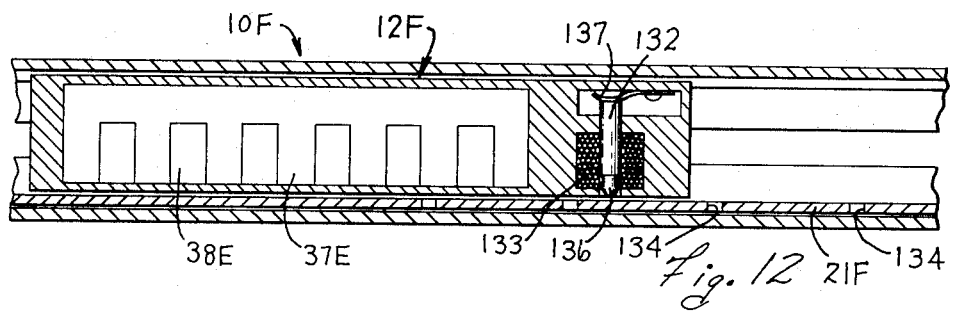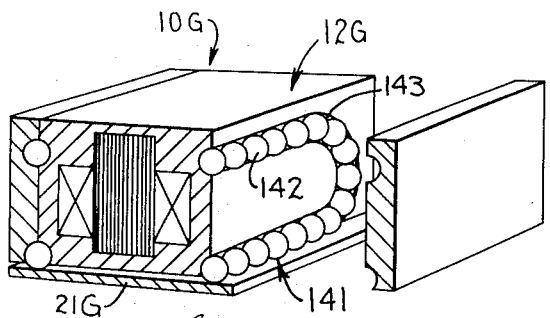

United States Patent Office 3,531,666
Patented Sept. 29, 1970

3,531,666
LINEAR INDUCTION MOTOR ACTUATOR
James A. Ford, Sturgis, Mich., assignor to Kirsch Company, Sturgis, Mich., a corporation of Michigan
Continuation-in-part of application Ser. No. 614,473, Feb. 7, 1967, which is a continuation-in-part of application Ser. No. 375,276, June 15, 1964, now abandoned. This application Mar. 18, 1968, Ser. No. 713,739
Int. Cl. H02k 41/02
U.S. Cl. 310—13
22 Claims

ABSTRACT OF THE DISCLOSURE

A linear motor construction having a stator member movable along an elongated and hollow track on the interior thereof, said track having an armature and energizable conductor elements extending therealong and fixed with respect thereto. Sliding contact elements are provided on said stator member for engaging said conductor elements to energize the field windings of said stator member so that the magnetic field produced by said stator member will create a reaction of said stator member with the armature member to cause said stator member to move longitudinally of the track.

CROSS REFERENCE TO RELATED APPLICATIONS

This application is a continuation-in-part of application Ser. No. 614,473, filed Feb. 7, 1967, now Pat. No. 3,374,-823, to be issued Mar. 26, 1968, which is a continuation-in-part of application Ser. No. 375,276, filed June 15, 1964, now abandoned.

FIELD OF THE INVENTION

This invention relates to induction motors and, more specifically, relates to an actuator that produces rectilinear movement through utilization of induction motor principles.

BACKGROUND OF THE INVENTION

The use of linear motors has been disclosed in the literature and prior patents as being applicable to many and varied apparatus. However, successful commercial application of linear motor principles has been hindered due in part to the inefficiency of the motor in that only a small amount of mechanical force was generated even upon the application of a large amount of electrical energy. This resulted not only in waste of input power but also in the generation of excessive heat with its resultant known problems. While motor constructions have now been improved to increase the efficiency thereof, they have still been of only limited use because their mechanical design, in paralleling that of rotating motors, created further problems.

For example, one of the reasons for such further problems is the fact that the moving part of the motor was exposed. Hence, where the environment of the linear motor was such that the moving part of the motor became covered with dirt, oil and other contaminants, the movement of such moving member would be hindered.

Another problems which arose in situations where the linear motor performed the function of transferring an object from one location to another, such as in assembly operations, was that the exposed parts were often capable of snagging other equipment located nearby. While this problem could be circumvented by the use of a protective housing, the housing adds to the cost of the installation and also takes up more space, all of which makes the utilization of linear motor constructions as presently known highly undesirable.

Accordingly, the objects of the present invention include:

(1) To provide a linear motor construction wherein the moving part is substantially contained within a suitable housing in all its operating positions.

(2) To provide a linear motor construction, as aforesaid, which is compact and has no protruding parts which can snag on other objects when the motor is energized and the movable member is moving along the track.

(3) To provide a linear motor construction wherein the stator is movable longitudinally of a hollow track on the inside thereof so that the movable part is protected at all times from dirt, oil and other contaminants.

(4) To provide a linear motor construction, as aforesaid, which will be effective in operation but which can be manufactured and maintained in operating condition at a minimum of cost.

(5) To provide a linear motor construction, as aforesaid, wherein the armature is utilized, at least in part, as the housing and no separate housing is needed.

(6) To provide a linear motor construction, as aforesaid, wherein the movable member can be built as a single, compact and inexpensive unit and wherein the armature is a part of the track so that said motor may be assembled by merely inserting the movable member in telescoping relationship with the track.

(7) To provide a linear motor construction, as aforesaid, wherein the armature and track may comprise a single unit or, alternatively, may comprise multiple units rigidly fixed with respect to each other.

(8) To provide a linear motor construction, as aforesaid, which utilizes a portion of the track assembly, or means fixed thereto, as a stationary armature and utilizes movement of the magnetic field generated by the field coils of said motor for effecting a traversing movement of a driven member.

Other objects and purposes of this invention will be apparent to persons acquainted with linear motors of this general type upon reading the following specification and inspecting the accompanying drawings, in which:

FIG. 10 is a sectional view taken along the line X—X of FIG. 9.

FIG. 11 is a schematic sectional view of a linear motor having a load on a conveyor secured for movement therewith.

FIG. 12 is a sectional view of a modified linear motor construction having a braking device thereon.

FIG. 13 is a schematic perspective view of a linear motor construction utilizing a linear bearing structure as a device for reducing the amount of friction between the movable member and the armature.

Figure 1:
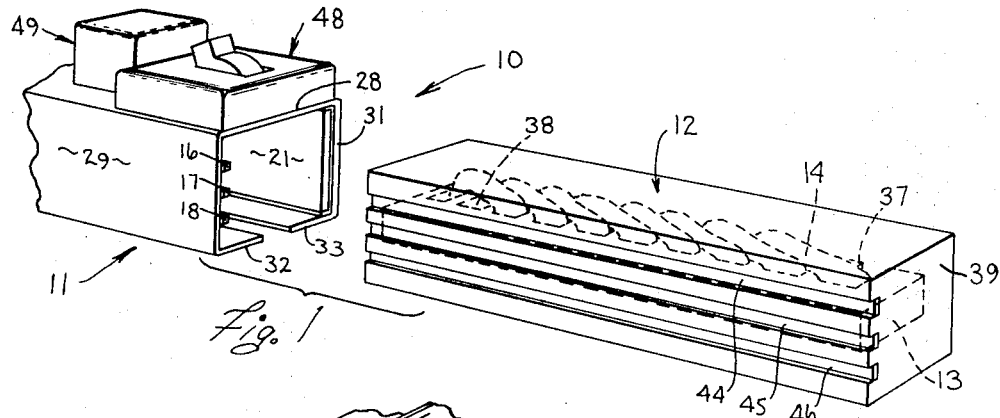
FIG. 1 is an exploded, perspective view of a linear motor construction embodying the invention.

Certain terminology will be used in the following description for convenience only and will not be limiting. The words "up," "down," "right" and "left" will designate directions in the drawings to which reference is made. The words "in" and "out" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the invention are met by providing a linear motor construction wherein the stator is movable along the interior of an elongated, hollow and fixed track and wherein conductors are mounted on the interior of said track and extend along the length thereof and are slideably engaged by contacts on the movable stator. Hence, the windings of the stator can be supplied with electrical energy whereby a magnetic field is generated by the stator windings to react with a reaction member mounted on, or comprising a part of, said track so that the generated magnetic field is affected to result in a movement of the movable stator longitudinally of the track.

DETAILED DESCRIPTION

Referring now to the drawings, the actuator unit or linear motor construction 10 (FIG. 1) comprises two basic parts, first, an elongated and hollow track 11 and, second, a movable member 12 housing a core 13 and the field coils 14 which member 12 is snugly but slideably receivable within the track. More particularly, and referring to FIG. 2, the track 11 comprises, in a preferred embodiment, a flat sheet of metal 15, preferably of ferromagnetic material. While the track 11 is in an unassembled condition, a plurality of elongated electrically conductive members on strips 16, 17 and 18 are secured to the sheet metal 15 and are insulated therefrom by insulation 19. The conductors are preferably equally spaced from each other and spaced from the right edge (FIG. 2) of the sheet metal 15 a predesignated distance.

A strip of nonmagnetic sheet metal 21, preferably of copper, forms the armature of the motor 10 and is secured to the sheet metal 15 by any convenient means such as an adhesive 22 and extends coextensively the length of the sheet metal 15. The metal strip 21 preferably has a width equal to the height or width of one of the walls of the track 11.

In assembling the track 11, the sheet metal 15 is bent or folded along the lines 23, 24, 25 and 26 to form a generally C-shaped construction having a top wall 28, a depending front wall 29 and a depending rear wall 31. The lower ends of the front wall 29 and rear wall 31, in this embodiment, comprise flanges 32 and 33 which extend inwardly parallel to the top wall 28 and the ends of which are spaced apart a distance defining a downwardly opening slot 34 so that the track surrounds the member 12 sufficiently to prevent transverse escape of the member 12 from said track.

The movable member 12 comprises the ferromagnetic core 13 formed from a plurality of identical toothed laminations which are suitably stacked and secured together to define poles 37 and slots 38. The slots 38 receive the field coils 14 which are of conventional coiled electrical conductor configuration arranged in the slots to form the stator portion 36 of the linear motor construction.

Figures 3, 3A:
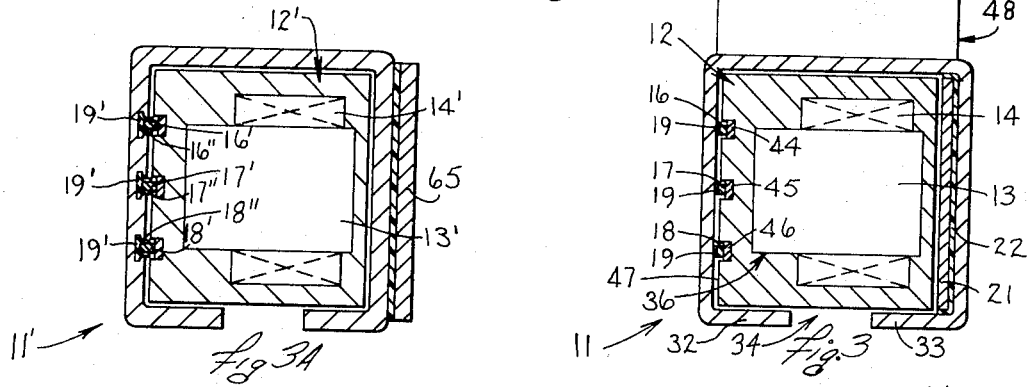
FIG. 3 is a sectional view of the linear motor.
FIG. 3A is a sectional view of a modified linear motor.

The stator portion 36 consisting of the ferromagnetic core 13 and the field coils 14 are encased in a mass or block of material 39 having low friction characteristics such as a self-lubricating plastic. The front wall of the block 39 comprises a plurality of grooves 41, 42 and 43 which accommodate power pick-up conductors on strips 44, 45 and 46, respectively. The grooves 41, 42 and 43 are spaced on the wall of the block 39 and receive the conductors 16, 17 and 18. Said conductors 16, 17 and 18 slideably engage said conductors 44, 45 and 46, respectively, in the grooves and the latter are suitably connected to the windings 14 of the stator. As seen in FIGS. 3 and 3A, the exterior shape of the mass 39 conforms to the interior shape of the track.

A switching device 48 is mounted on the upper surface of the top wall 28 of the track 11. The switching device serves to selectively connect the conductors 16 and 17 (FIG. 4) to a source of electrical energy 50. The enclosure 49 mounted closely adjacent the switching device 48 houses a capacitor 51 which serves to effect an electromagnetic field which, in accordance with conventional induction motor principles, moves longitudinally along the toothed surface of the stator 36.

Figure 4:
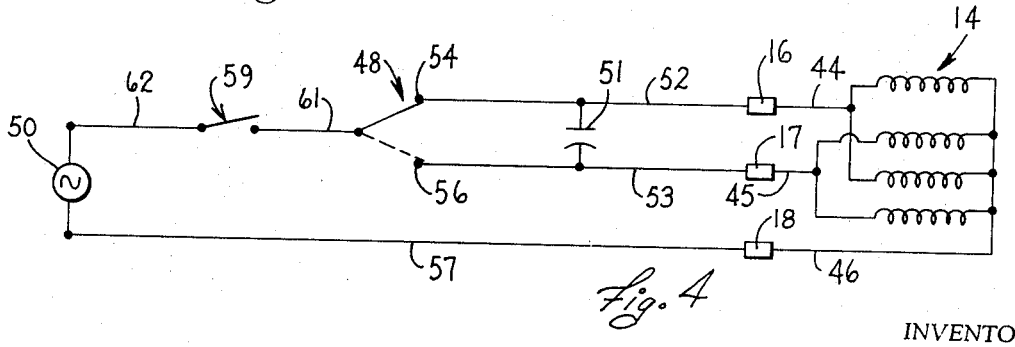
FIG. 4 is an electrical schematic of the linear motor embodying the invention.

Referring now more specifically to the electrical schematic illustrated in FIG. 4, the field coils 14 are connected to the conductors 44, 45 and 46. The conductors 44, 45 and 46 slideably engage the elongated electrical conductors 16, 17 and 18, respectively. The conductors 16 and 17 are connected by conductors 52 and 53, respectively, to the terminals 54 and 56 of the switch 48. The capacitor 51 is connected between the conductors 52 and 53. The conductor 18 is connected through a conductor 57 to one side of the electrical source not shown. The wiper arm 58 of the switch 48 is connected to one side of an "on-off" switch 59 by a conductor 61. The other side of the switch 59 is connected by a conductor 62 to the other side of the source of electrical energy not shown.

FIG. 3A illustrates a modified extruded track construction 11' made of aluminum wherein the iron core 65 is secured to the outer periphery of the track 11' on the side adjacent the stator poles 37' and slots 38'.

If desired, grooves 16", 17" and 18" can be formed on the interior of the track 11' and conductors 16', 17' and 18' having insulation 19 thereon can be slid into the grooves for easy assembly.

The movable member 12' can be identical to the member 12 and power is supplied to the coils 14' through the same type of slideable conductor coupling as is shown in FIG. 3.

OPERATION

The operation of the device embodying the invention will be described in detail hereinbelow for a better understanding of the invention.

A closing of the "on-off" switch 59 will energize the conductor 16 and conductor 17 through the capacitor 51. The capacitor 51 between the conductors 52 and 53 will cause a phase angle displacement of the potential on the conductor 17 relative to the conductor 16 so that an electromagnetic field is produced in accordance with conventional induction motor principles which moves along the toothed surface of the stator 36. The flux generated through the energization of the field coils 14 passes through the armature 21 to the ferromagnetic track 11. The ferromagnetic track forms the flux return path for the electromagnetic flux generated by the stator 36.

In theory, the flux passing through the armature 21 has the effect of producing an infinite number of conductors which are cut by the pulsating flux produced by the stator 36. Thus, a current is induced in each of the infinite number of conductors that is cut by the stator flux to produce movement of the armature in the direction of travel of the magnetic field produced by the stator. The direction of travel of the magnetic field produced by the stator is reversible by actuation of the switch 48 described above to the dotted line position in FIG. 4.

MODIFIED CONSTRUCTION OF FIG. 5

Figure 2:
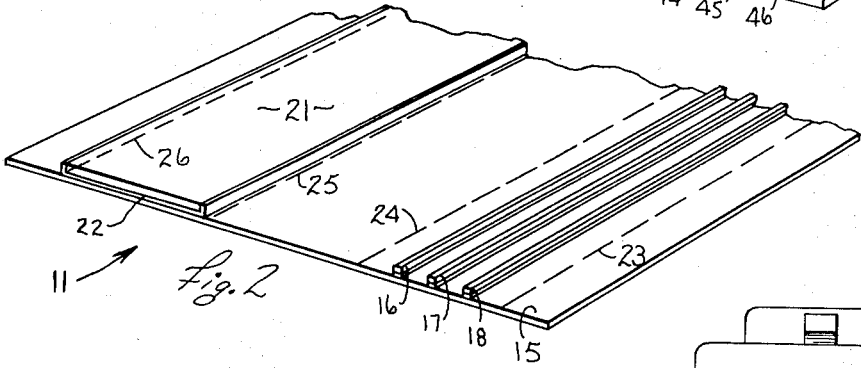
FIG. 2 is a perspective view of a track in an unassembled condition having the elongated electrical conductors and armature member secured thereto.
Figure 5:
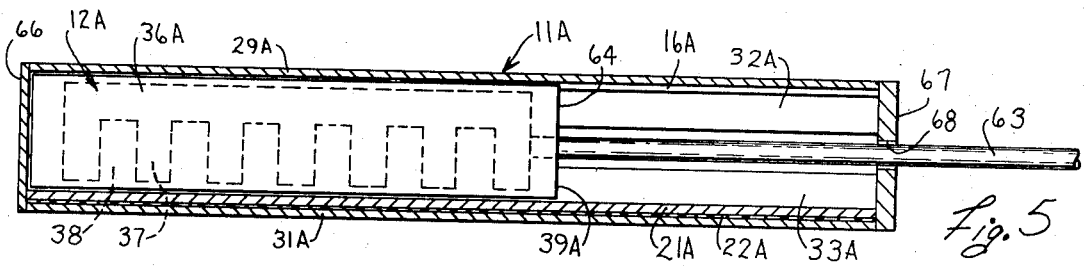
FIG. 5 is a sectional view of a linear motor embodying the invention wherein the driven member is a rod.

The embodiment illustrated in FIG. 5 is a sectional view of a structure which is identical to that illustrated in FIGS. 1-3. Accordingly, the component parts of the modified structure 10A will be referred to by the same reference numerals designated corresponding components of the linear motor construction 10 but with the suffix "A" added thereto. An elongated rod 63 is secured to the right end 64 of the movable member 12A.

Figure 9:
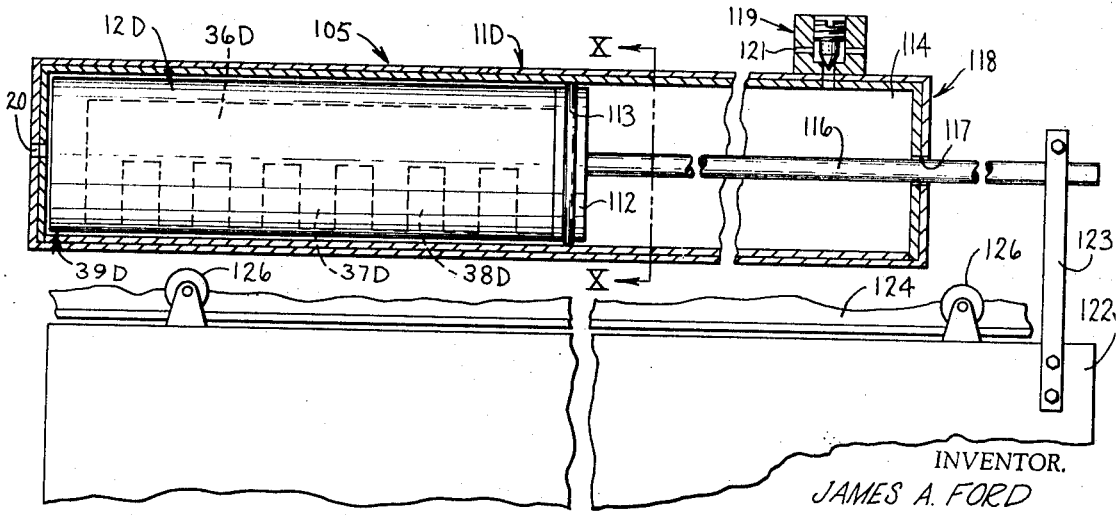
FIG. 9 is a sectional view of a door opening and closing apparatus utilizing a linear motor as the driving member.

In this particular embodiment, the track 11A has a pair of end caps 66 and 67 secured thereto, the end cap 67 having an opening 68 therethrough which receives the rod 63. Thus, upon energization of the field coils on the stator 36A, the movable member 12A will move longitudinally along the track 11A to cause a movement of the rod 63 therewith. Thus, the actuator unit 10A can be used in place of a hydraulic cylinder and thereby enables the removal of all hydraulic fluid conduits which results in a more compact construction. It is recognized, of course, that the rod 63 can have a coupling device (not shown) on the outer end thereof for coupling the rod 63 to a load, such as is illustrated in FIG. 9.

MODIFIED CONSTRUCTION OF FIGS. 6 AND 7

Figure 6:
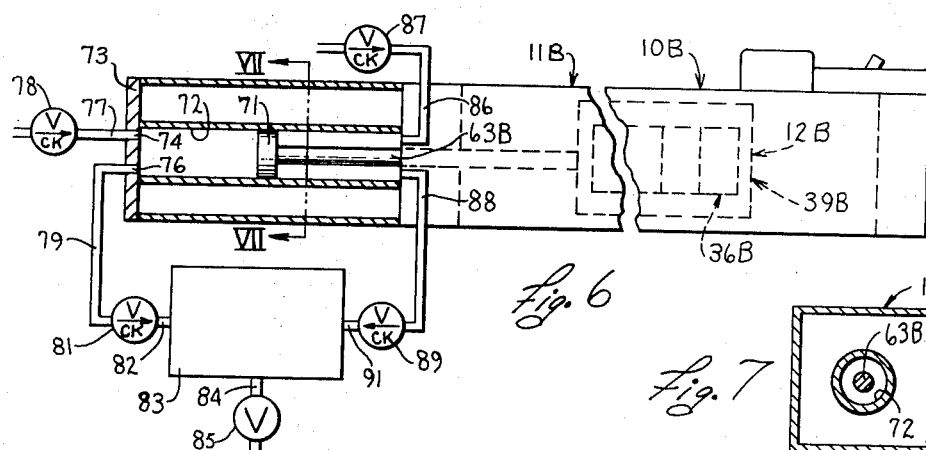
FIG. 6 is a partial side-sectional view of a compressor unit wherein the piston member is driven reciprocably by the linear motor.
Figure 7:
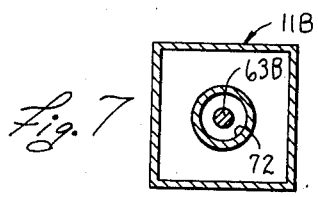
FIG. 7 is a sectional view taken on line VII—VII of FIG. 6.

The actuator unit or linear motor unit 11B of FIGS. 6 and 7 is identical to the linear motor constructions discussed hereinabove. The component parts of the modified construction 10B will be referred to by the same reference numerals designated corresponding parts of the linear motor construction 10A but with the suffix "A" replaced with the suffix "B."

In this particular embodiment, the rod 63B has a piston member 71 secured to the outer end thereof. The piston 71 is movable back and forth in an elongated cylindrical chamber 72 and sealingly and slidingly engages the internal surface thereof. The reciprocable movement of the movable member (not shown) can be accomplished in a conventional manner through the utilization of a limit switch which is actuated when the movable member reaches an extreme end position to reverse the direction of the traveling magnetic field and the movable member.

In this particular embodiment, the left end of the cylindrical chamber 72 (FIG. 6) has an end cap 73 secured thereto, said end cap 73 having a pair of openings 74 and 76 therein. The opening 74 has a conduit 77 and a check valve 78 connectible in circuit therewith, said check valve being biased to permit fluid to flow in only one direction into the chamber 72. The opening 76 has a conduit 79 and check valve 81 connected in circuit therewith, the check valve 81 being biased to permit the flow of fluid in only one direction, namely out of the chamber 72. The output of the check valve 81 is connected by a conduit 82 to a pressurized fluid storage chamber 83 which has an outlet 84 and a controllable valve 85 for releasing the contents of the chamber 83.

The right end of the chamber 72 is provided with a conduit 86 connected in circuit with the chamber 72 on the right side of the piston 71. The conduit 86 has a check valve 87 connected in circuit therewith, said check valve 87 permitting the flow of fluid in only one direction, namely into the chamber 72. A conduit 88 also connects the right end of the chamber 72 to a check valve 89, said check valve permitting the flow of fluid in only one direction, namely out of the chamber 72 and into the pressurized fluid storage chamber 83 through a conduit 91.

Thus, upon a continuous reciprocation of the piston 71 within the chamber 72, fluid will alternatively be drawn into the chamber 72 through the check valves 78 and 87 and expelled by the piston 71 from the chamber 72 through the check valves 81 and 89 into the pressurized fluid storage chamber 83. The outlet 84 of the storage chamber can be connected as desired to a fluid operated system (not shown).

MODIFIED CONSTRUCTION OF FIG. 8

Figure 8:
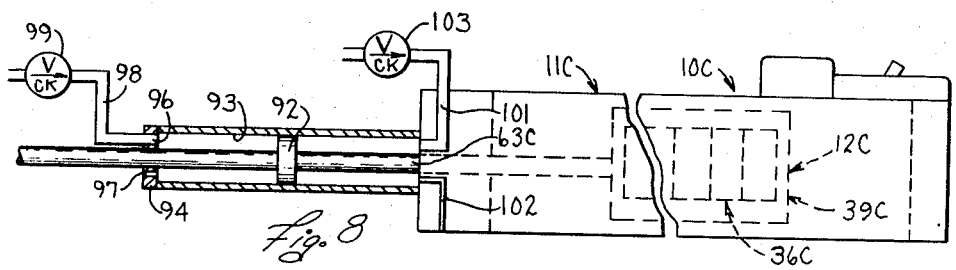
FIG. 8 is a partial side-sectional view of a speed control device for a linear motor.

The system illustrated in FIG. 8 is operated by a linear motor construction 10C identical to the linear motor construction discussed hereinabove. The component parts of the modified construction 10C will be referred to by the same reference numerals designated corresponding parts of the structure 10A but with the suffix "A" replaced with the suffix "C."

In this particular embodiment, the rod 63C has a piston 92 secured thereto for movement back and forth within an elongated cylinder 93. The piston sealingly and slidingly engages the internal surface of the cylinder 93. The left end of the cylinder 93 has an end cap 94 secured thereto, said end cap having openings 96 and 97 therein, the opening 97 being of a small and precise size in diameter thereby constituting a metered outlet. The opening 96 has a conduit 98 and check valve 99 connected in circuit therewith, the check valve permitting the flow of fluid in only one direction, namely into the chamber defined by the cylinder 93 on the left side of the piston 92.

The left end of the cylinder 93 has a pair of conduits 101 and 102 connected in circuit with the chamber defined by said cylinder on the right side of the piston 92. The conduit 102 is of a small and precise size in diameter thereby constituting a metered outlet. The conduit 101 has a check valve 103 connected in circuit therewith, said check valve permitting the flow of fluid in only one direction, namely into the cylinder 93 on the left side of the piston 92.

Thus, as the movable member (not shown) of the linear motor construction 10C is reciprocated back and forth within the track 11C, the piston 92 is moved back and forth within the cylinder 93. Assuming that the initial movement of the piston 92 is in a leftward direction, the fluid within the cylinder 93 will be permitted to escape through the metered outlet 97 at a rate determined by the diameter of the opening 97. Fluid cannot escape through the conduit 98 due to the particular biasing of the check valve 99. Thus, the piston 92 and rod 63C will move leftwardly at a predetermined speed determined by the diameter of the metered outlet 97.

When the piston 92 has reached its leftwardmost extent, the movable member will undergo a reversal so that the piston 92 will begin to move rightwardly. The fluid trap on the right side of the piston 92 in the cylinder 93 will be permitted to flow at a metered rate through the metered outlet 102. Fluid cannot escape through the conduit 101 due to the biasing of the check valve 103. As a result, the piston and rod 63C will move rightwardly at a predetermined rate determined by the diameter of the metered outlet 102. It is recognized, of course, that devices may be utilized to varying the orifice of the metered outlets to permit an adjustment in the speed of the movable member.

Thus, the system illustrated in FIG. 8 forms a speed control device for the linear motor construction 10C.

MODIFIED CONSTRUCTION OF FIGS. 9 AND 10

In this particular embodiment, the linear motor construction 10D is similar to the linear motor constructions discussed hereinabove except that the construction has a circular cross section (FIG. 10). The component parts of the stator 36 are similar to the embodiments discussed hereinabove but due to the particular circular cross section, a modification of the track structure 105 has been made necessary. However, the component parts of the stator 36D will be referred to by the same reference numerals designating corresponding parts of the stator 36B but with the suffix "B" replaced with the suffix "D."

The track 105 comprises an inner tubular member 106 having an arcuate and elongated portion thereof removed and replaced with a corresponding elongated and arcuate segment 107 of nonmagnetic material, such as copper, forming the armature of the motor. The copper segment or armature 107 can be secured to the edges 108 and 109 of the tubular member 106 by any convenient means, such as by brazing, soldering or the like.

An outer tubular member is sleeved onto the tubular member 106 and the arcuate segment 107. The outer tubular member 11 is preferably of a ferromagnetic material so that the portion thereof adjacent the copper segment 107 forms the ferromagnetic core for the flux return path for linear motor construction 10D.

In this particular embodiment, the stator 36D is encased in plastic material 39D having a circular cross section as illustrated in FIG. 10. The diameter of the material 39D is slightly less than the inner diameter of the tubular member 106 and the arcuate segment 107. Furthermore, the poles 37D are positioned closely adjacent the copper segment 107.

The right end of the movable member 12D has an annular plate 112 secured thereto having an O-ring 113 secured therein and slidably engaging the interior surfaces of the tubular member 106 and the arcuate copper segment 107. The O-ring 113 serves to seal air in the chamber portion 114 located to the right thereof.

A rod 116 is secured to the right end of the movable member 12D and extends through an opening 117 in the wall portion 118 of the track 105.

A valving member 119 is secured to the outer surface of the track 105 and has variable metered outlets 121 therein for permitting a regulated amount of air to escape therethrough from the chamber 114. An opening 120 is located in the left end of the track 105 to permit the egress and ingress of air on the left side of the movable member 12D. Thus, as the movable member 12D moves rightwardly, for example, the right end of the movable member 12D will act as a piston and push the air contained within the chamber 114 out through the metered outlets 121 to cause the movable member 12D to move at a predetermined speed dependent upon the setting of the valve 119.

The rightwardmost end of the rod 116 is secured to a desired load, such as a conventional sliding door 122 by a bracket member 123, said door being supported upon an elongated track 124 and movable relative thereto on roller members 126. Thus, the linear motor construction 10D serves both to effect an opening and closing of the door 122 and to limit the speed thereof.

MODIFIED CONSTRUCTION OF FIG. 11

The structure 10E is identical to the structure 10 illustrated in FIGS. 1-3. The parts of the modified structure 10E will be referred to by the same reference numerals designating corresponding parts of the structure 10 but with the suffix "E" added thereto. In this particular embodiment, a hook 127 is secured to the movable member 12E. The track 11E is preferably located above a conventional conveyor mechanism 128 so that an object 129 supported thereby may be releasably connected by a cable 131 to the hook 127 and moved longitudinally of the conveyor 128. Thus, energization of the field windings of the stator 36E will result in the movable member 12E moving longitudinally of the track 11E thereby causing a movement of the object 129 along the conveyor 128.

MODIFIED CONSTRUCTION OF FIG. 12

The linear motor construction 10F is identical to the structure 10 illustrated in FIGS. 1-3. The parts of the modified structure 10F will be referred to by the same reference numerals designating corresponding parts of the structure 10 but with the suffix "F" added thereto. In this particular embodiment, the movable member 12F has a solenoid operated pin 132 which is movable between a fully retracted position as illustrated in FIG. 12 to a fully extended position not shown. The solenoid is encased by plastic material 39F so that it is an integral part of the movable member. Movement of the pin 132 to the retracted position is caused by an energization of the solenoid winding 133. Movement of the pin to the extended position is caused by a leaf spring 137 engaging one end thereof said spring 137 being biased to urge the pin to the extended position. In this particular embodiment, the armature 21F has a plurality of spaced apart but horizontally aligned openings 134 therein which are aligned to receive the end 136 of the pin 132 when the pin 132 is in the fully extended position. It is recognized, of course, that pin 132 could be aligned to engage other sides of the track and being received in properly aligned openings in the other sides.

Upon energization of the field windings, the winding 133 is energized to retract the pin 132. Upon de-energization of the field windings, the winding 133 will also be de-energized so that the leaf spring 137 will push the pin 132 into engagement with the armature 21F and while the movable member 12F is coasting, the pin 132 will slip into the first available opening 134 to lock the movable member 12F in that position.

MODIFIED CONSTRUCTION OF FIG. 13

The structure 10G illustrated in FIG. 13 is for all practical purposes identical to the structure 10 illustrated in FIGS. 1-3. However, the movable member 12G is supported on the armature 21G by a linear bearing construction 141 with circulatable ball elements 142. Thus, as the movable member 12G moves longitudinally along the armature 21G, the ball elements 142 of the linear bearing 141 will circulate in the groove path 143 and result in the movable member 12G moving relatively easily and with a low coefficient of friction. While only the stator 36G and the armature 21G are illustrated, it is recognized that the field windings can be energized in the same manner as is illustrated in the previous embodiments, namely through the elongated electrically conductive elements secured to the inner surface of the track.

Although a particular preferred embodiment of the invention has been disclosed in detail for illustrative purposes, it will be recognized that variations and modifications of the disclosed apparatus including the rearrangement of parts, lie within the scope of the present invention.

The embodiments of the invention in which an exclusive property or privilege is claimed are defined as follows:

1. A linear motor comprising:
   an elongated stator member including a core of magnetic material having a plurality of winding slots spaced longitudinally therealong, windings on said core having portions positioned within said winding slots, and a mass of non-metallic, low friction material within which said core and windings are encased;
   an elongated, hollow track, said stator member being disposed inside said hollow track for linear movement therealong, said track peripherally surrounding said stator member at least to an extent sufficient to positively preclude escape of said stator member from said track transversely of the length of said track, said stator member being encased in a non-metallic, low-friction mass having a cross-section shape conforming to the interior cross-sectional shape of said hollow track and said non-metallic, low friction mass being snugly but freely longitudinally received within said track so that said stator member is guided by said non-metallic low friction mass for longitudinal movement along said track;
   a plurality of electrically conductive supply strips mounted by insulation on an inner wall of said track and extending along the length of said track, said conductive supply strips being connectible to an electrical power source;
   conductive pickup strips on said non-metallic mass connected to said windings and slideably contacting said conductive supply strips for energizing said windings;
   a reaction member of conductive material fixed with respect to said track, facing the interior of said track and extending lengthwise thereof, said reaction member being positioned adjacent said core but being spaced therefrom by a substantially uniform gap extending the length of said stator member, said uniform gap being maintained by the portion of said non-metallic, low-friction mass in said gap;

whereby energization of said windings creates a magnetic field across said gap which acts upon said reaction member to cause said stator member to move along said track.

2. A linear motor as defined in claim 1, wherein:
said track is of a hollow substantially rectangular configuration with one of the walls of said track having an elongated slot extending lengthwise thereof in communication with the interior of said hollow track;
said stator member having mounting means secured thereto and extending outwardly through said elongated slot;
said reaction member comprising a flat, planar strip secured to another wall of said track means.

3. A linear motor as defined in claim 1, wherein said elongated track comprises an elongated hollow tubular member, said stator member being mounted internally of said tubular member for movement longitudinally along the inside thereof; and
wherein said pick-up means on said stator member slideably contact said conductive supply strips for energizing said windings to generate a moving magnetic field which results in a movement of said stator member along said tubular member.

4. The linear motor as defined in claim 1, including an elongated rod secured to one end of said stator member, whereby actuation of said motor will cause said stator member and said rod to move longitudinally.

5. The linear motor as defined in claim 4, wherein said rod extends outwardly from one end of said track.

6. The linear motor as defined in claim 4, including an elongated and enclosed cylindrical member adjoining one end of said track, said rod extending through the center portion thereof; and
further including piston means sealingly and slideably engaging the internal walls of said cylindrical member to thereby form variable capacity chamber means;
valving means at least at the other end of said cylinder member for regulating the fluid entering and leaving said variable capacity chamber means;
whereby movement of said stator member will cause said piston means in said variable capacity chamber means to urge said fluid through said valving means.

7. The linear motor as defined in claim 6, wherein said valving means for regulating said fluid leaving said variable capacity chamber means comprise orifice means.

8. The linear motor as defined in claim 4, including an elongated cylindrical member enclosed on both ends having one end thereof adjoining said one end of said track, said rod extending through the center portion thereof; and
further including piston means secured to said rod slidingly and sealingly engaging the internal walls of said cylindrical member intermediate said ends thereof to thereby form first and second variable capacity chambers;
valving means at said ends of said cylindrical member for regulating the fluid entering and leaving said variable capacity chambers;
whereby a movement of said stator will cause a movement of said piston in said cylindrical member to vary the capacity of said variable capacity chambers to urge said fluid through said valving means.

9. The linear motor as defined in claim 8 including pressurized fluid storage means connected in fluid circuit with said first and second variable capacity chambers whereby movement of said piston means by said linear motor will cause said fluid in said variable capacity chambers to be pumped into said pressurized fluid storage means.

10. The linear motor as defined in claim 8, wherein said valving means for regulating said fluid leaving said variable capacity chambers comprise orifice means.

11. The linear motor as defined in claim 6, wherein said piston means comprises sealing means secured to said stator member sealingly and slidingly engaging the internal walls of said cylindrical member.

12. The linear motor as defined in claim 11, including adjustable orifice means adjacent said other end of said cylindrical member for regulating the fluid entering and leaving said variable capacity chamber means.

13. The linear motor as defined in claim 1, including coupling means secured to said stator member whereby upon engagement of an object to said coupling means and energization of said linear motor, said object will be propelled in a direction coextensive with said track.

14. The linear motor as defined in claim 1, including energizable means mounted on said stator and means on said track engageable by said energizable means for releasably locking said stator member to said track.

15. The linear motor as defined in claim 14, wherein said energizable means comprises a solenoid actuated pin housed within said stator member and resilient means resiliently urging said pin to a fully extended position and being retractable upon energization of said energizable means; and
wherein said means on said track comprises a plurality of horizontally spaced openings in said track; and
including means effecting energization of said energizable means;
whereby upon de-energization of said energizable means and said linear motor, said resilient means will urge said pin into a first available opening in said track to lock said stator to said track means.

16. The linear motor as defined in claim 1, including bearing means supporting said stator member on said track for a low frictional engagement of said stator member with said track.

17. The linear motor as defined in claim 16, wherein said bearing means comprises a plurality of circulatable ball elements engaging said track and movable between positions wherein said ball elements engage said track and wherein said ball elements are free of engagement with said track during the circulatory movement.

18. A linear motor as defined in claim 1, including also a strip of magnetic material fixed with respect to said conductive material.

19. A linear motor as defined in claim 1, wherein a strip of magnetic material is fixed with respect to said reaction member and extends substantially coextensive therewith.

20. A linear motor as defined in claim 1, wherein at least a portion of said reaction member is of substantially planar cross section and wherein there is provided a strip of magnetic material also substantially planar in cross section which is laminated to said reaction member and extends lengthwise thereof.

21. The device of claim 1 wherein said elongated hollow track is of conductive material and said reaction member is a portion thereof.

22. The device of claim 1 wherein said elongated hollow track is of magnetic material and the reaction member is fixed to an inner surface thereof.

References Cited

UNITED STATES PATENTS

| | | | |
|---|---|---|---|
| 1,881,015 | 10/1932 | Ayers | 310—13 XR |
| 3,331,428 | 7/1967 | Ford | 160—331 |
| 2,122,888 | 7/1938 | McLeer | 318—131 XR |
| 2,868,280 | 8/1954 | Strong et al. | |
| 3,162,796 | 12/1964 | Schreiber et al. | 318—135 |
| 3,333,124 | 7/1967 | Francis et al. | 310—13 |

(Other references on following page)

References Cited

| | | | |
|---|---|---|---|
| 2,337,430 | 12/1943 | Trombetta | 310—13 |
| 3,335,300 | 8/1967 | Von Brimer | 310—13 |
| 1,881,014 | 10/1932 | Ayers | 310—13 XR |
| 1,089,778 | 3/1914 | McLeer | 310—13 |
| 1,986,639 | 1/1935 | Konn | 310—13 |
| 3,103,603 | 9/1963 | Reutter | 310—30 |

FOREIGN PATENTS

| | | |
|---|---|---|
| 1,130,512 | 5/1962 | Germany |

OTHER REFERENCES

Brady: Materials Handbook, Ninth ed., 1959, p. 292, McGraw-Hill Book Co.

MILTON O. HIRSHFIELD, Primary Examiner

B. A. REYNOLDS, Assistant Examiner

U.S. Cl. X.R.

160—331; 318—135